(12) United States Patent
Long

(10) Patent No.: US 8,091,914 B1
(45) Date of Patent: Jan. 10, 2012

(54) UNIVERSAL TRAILER HITCH GUIDE APPARATUS

(75) Inventor: Merlyn R. Long, Statesville, NC (US)

(73) Assignee: Merlyn R. Long, Statesville, NC (US)

( * ) Notice: Subject to any disclaimer, the term of this patent is extended or adjusted under 35 U.S.C. 154(b) by 0 days.

(21) Appl. No.: 12/868,964

(22) Filed: Aug. 26, 2010

(51) Int. Cl.
*B60D 1/36* (2006.01)
(52) U.S. Cl. ........................................ 280/477
(58) Field of Classification Search ............ 280/477
See application file for complete search history.

(56) References Cited

U.S. PATENT DOCUMENTS

| | | |
|---|---|---|
| 3,420,549 A | 1/1969 | Robinson |
| 4,871,185 A | 10/1989 | Charkroff et al. |
| 4,974,866 A | 12/1990 | Morgan |
| 5,113,588 A | 5/1992 | Walston |
| 5,236,215 A | 8/1993 | Wylie |
| 5,769,443 A | 6/1998 | Muzny |
| 6,976,694 B1 * | 12/2005 | Rayl et al. ............. 280/477 |
| 2006/0082101 A1 | 4/2006 | England |

* cited by examiner

*Primary Examiner* — Tony H. Winner
(74) *Attorney, Agent, or Firm* — Shumaker, Loop & Kendrick LLP

(57) ABSTRACT

A trailer hitch guide including a guide having first and second halves interconnected through a cooperatively formed hinge having a releasable hinge pin, first and second neck surrounds cooperatively defining geometry for surrounding a tow-ball, a base including first and second arms, and a clamp cooperatively carried on the first and second arms for urging the first and second arms together around a hitch, wherein the first and second halves are connected to the first and second neck surrounds, respectively, and the first and second neck surrounds are pivotally connected to the base.

18 Claims, 8 Drawing Sheets

UNIVERSAL TRAILER HITCH GUIDE APPARATUS

TECHNICAL FIELD AND BACKGROUND OF THE INVENTION

1. Field of the Invention

The present invention relates generally to a guide apparatus for physically aligning a trailer with a tow-ball of a hitch of a vehicle, and more particularly, to a trailer hitch guide configured for temporary installation around a tow-ball of a hitch without requiring modification to the hitch or removal of the tow-ball for installation, the guide including a universal guiding portion and a mounting base that each define corresponding adjustment features to ensure proper interconnection between the two while accommodating a variety of hitch types.

2. Background of the Invention

It is a common problem for a driver of a vehicle to back the trailer hitch of a vehicle into proper alignment with a trailer to be loaded thereon without practice, the help of a spotter, or having to repeatedly stop the vehicle, exit and visually check the alignment progress. While aligning any type of trailer can be challenging, achieving proper alignment is more difficult when the trailer is unloaded and/or includes a load thereon that is not visible to the driver for guiding purposes. While the misalignment of the hitch and trailer can easily be corrected when dealing with light loads that can be manipulated by hand, it may not be possible to manipulate a heavily loaded trailer by hand.

Various devices have been developed to aid a driver in aligning a hitch with a trailer, such as visual, audible and physical guides. With respect to visual guides, these types of guides generally include long, vertically extending markers or "feelers" provided on at least one of the hitch and trailer to provide a visual indication of satisfactory alignment to the driver. While these devices may function well in certain applications, their use is limited to applications in which adequate room is provided to effectively position the device in a way that it can be seen and utilized by the driver. Further, while guiding alignment, visual devices do not offer physical protection to the vehicle, hitch or trailer in the event of misalignments. Other types of guiding devices include those that must be permanently installed on a hitch and those that require tools for installation. While several of these types of devices provide physical protection against misalignments, their requirement of tools and modification to the hitch for installation results in a "permanent" installation.

Accordingly, to overcome the disadvantages of the prior art devices, the present invention provides a protective-type hitch guide configured to be temporarily installed on a hitch during loading without the need for modifying the hitch or removing the tow-ball. The trailer hitch guide provided herein is further advantageous in that it universal to accommodate a variety of hitch types and tow-ball configurations through adjustability between its guiding portion and base.

BRIEF SUMMARY OF THE INVENTION

In one aspect, a trailer hitch guide is provided for guiding a trailer into proper alignment with a tow-ball of a hitch.

In another aspect, a trailer hitch guide is provided including a guide and a base, wherein the guide includes first and second members releasably interconnected through a hinge having a hinge pin and cooperatively defining a general "V" shape for physically guiding a misaligned trailer tongue into proper alignment with the tow-ball.

In yet another aspect, the guide is adjustable in at least the fore and aft directions relative to the tow-ball and base to accommodate various ball sizes and arrangements, thus ensuring universal application.

In yet another aspect, the trailer hitch guide is installed without requiring modification to the existing hitch or removal of the tow-ball, thus allowing temporary attachment and removal after loading.

In yet another aspect, the trailer hitch guide provides physical protection of the vehicle from misalignments.

In yet another aspect, the trailer hitch guide physically deflects a misaligned trailer tongue toward the tow-ball of the hitch.

In yet another aspect, the guide includes various base configurations each having adjustability for accommodating a variety of hitch types including chassis-bolted hitches, receiver hitches and step bumper hitches, among others.

In yet another aspect, the guide is constructed from high gauge steel or like material for strength and durability, and may optionally be galvanized or include a protective coating to resist corrosion.

To achieve the foregoing and other aspects and advantages, a trailer hitch guide for mounting around a tow-ball of a vehicle hitch is provided including a guide having first and second halves cooperatively forming a hinge interconnecting the first and second halves, each of the first and second halves defining a substantially planar guiding surface and a flange oriented substantially perpendicular to the guiding surface, wherein at least one of the planar guiding surface and the flange define at least one elongate slot therethrough, a releasable hinge pin for maintaining the hinge, first and second neck surrounds cooperatively defining geometry corresponding to a neck of a tow-ball, a base including first and second arms, and a clamp cooperatively carried on the first and second arms for urging the first and second arms together around the hitch, wherein the first and second halves are connected to the first and second neck surrounds, respectively, and the first and second neck surrounds are pivotally connected to the base.

In a further embodiment, each of the first and second arms defines a general "L"-shape wherein a first end of each of the first and second arms is adjustably interconnected with a plate and a second end carries the clamp.

In a further embodiment, the first and second neck surrounds are pivotally connected to the base. In a further embodiment, the first and second halves are pivotally connected to the base.

In a further embodiment, the first and second halves each define at least one elongate slot through their guiding surface oriented generally perpendicular to the hinge, and wherein the trailer hitch guide further comprises first and second stabilizing brackets defining an elongate slot that aligned perpendicularly with respect to the at least one elongate slot through the guiding surface.

In a further embodiment, each of the first and second stabilizing brackets is generally "L"-shaped and the first and second halves cooperatively define a "V"-shape.

In a further embodiment, the guide, the first and second neck surrounds, and the base are adjustably interconnected.

In a further embodiment, the first and second arms each include at least one opening therethrough and at least one common fastener is received through the first and second arms, first and second members, and flanges of the first and second halves, and the first and second arms each terminate at a first end at the face plate and at a second end at a clamp that functions to urge the second ends of the arms toward each other.

BRIEF DESCRIPTION OF THE DRAWINGS

Other features, aspects and advantages of the present invention are better understood when the following detailed description of the invention is read with reference to the accompanying drawings, in which.

DETAILED DESCRIPTION OF THE INVENTION

Figure 1:
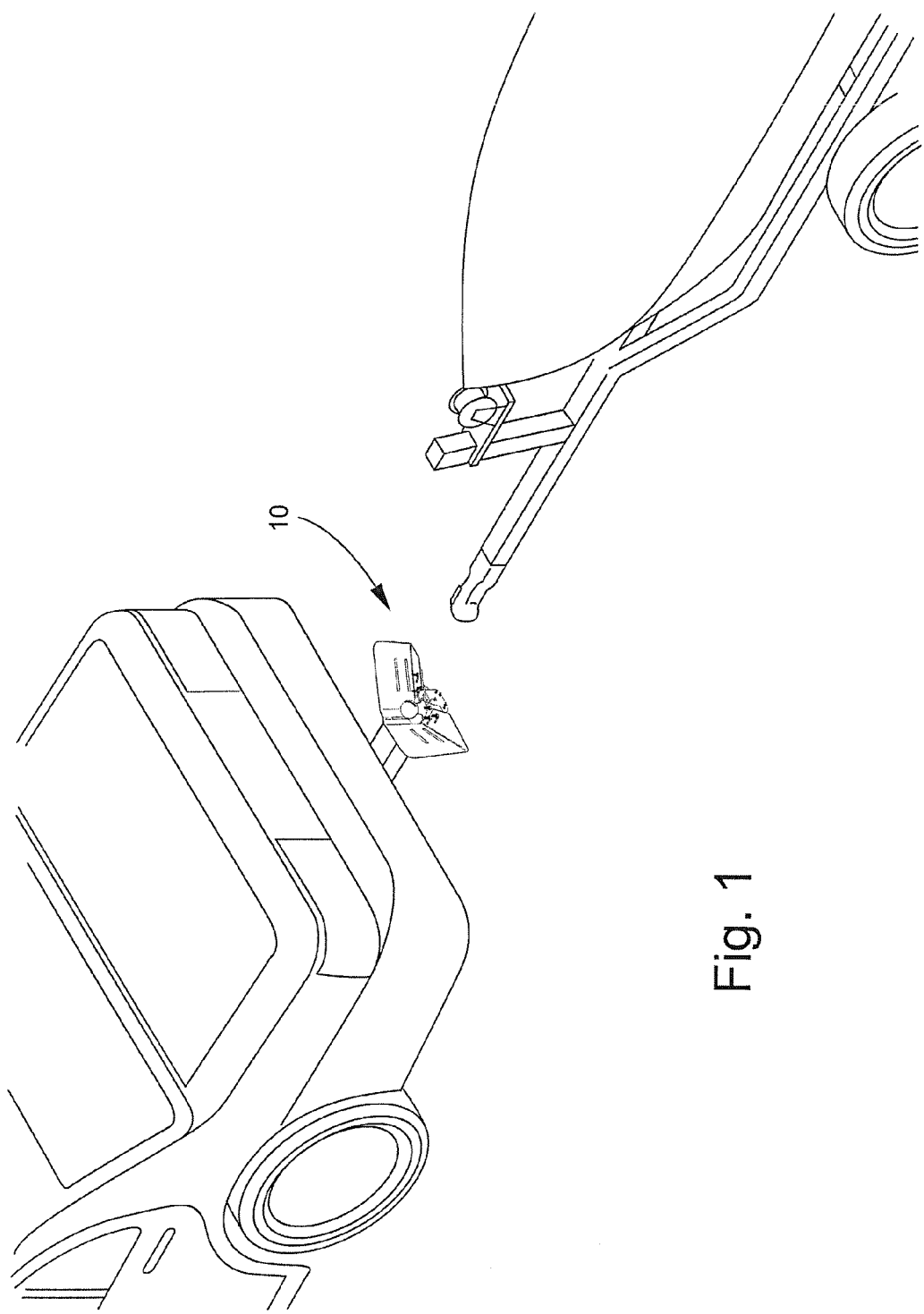
FIG. 1 is an environmental view illustrating alignment of a vehicle hitch and trailer utilizing a trailer hitch guide in accordance with an embodiment of the invention.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

Referring to the drawings, various embodiments of a universal trailer hitch guide are illustrated and described herein for aiding a driver in aligning the tongue of a trailer or other conveyance to be loaded with a tow-ball of a hitch. Due to the ease of attachment of the trailer hitch guide to the hitch, also referred to herein as "installation" or "mounting", without requiring modification to the existing hitch or removal of the tow-ball for attachment, it is envisioned that the trailer hitch guide embodiments described herein provide "temporary" installation with removal after loading.

Referring to FIG. 1, a first embodiment of a trailer hitch guide apparatus, referred to herein generally as "guide apparatus" or "the guide apparatus", is shown at reference numeral 10. The guide apparatus 10 is shown mounted to an existing chassis mounted-type hitch including at least one tow-ball, however, it should be understood that the guide embodiments provided herein are configured to be mounted to any hitch type including, but not limited to, chassis mounted hitches, receiver-type hitches, bumper hitches, and step bumper hitches. In multi tow-ball embodiments including varying sizes of tow-balls positioned peripherally around the hitch, the guide apparatus 10 is configured to be installed functionally surrounding the tow-ball in use while accommodating the other tow-balls not in use. The guide apparatus 10 functions as intended regardless of tow-ball configuration and may be scaled to accommodate any tow-ball size, hitch size, and margin of error desired to be "captured" by the guide apparatus.

Figure 2:
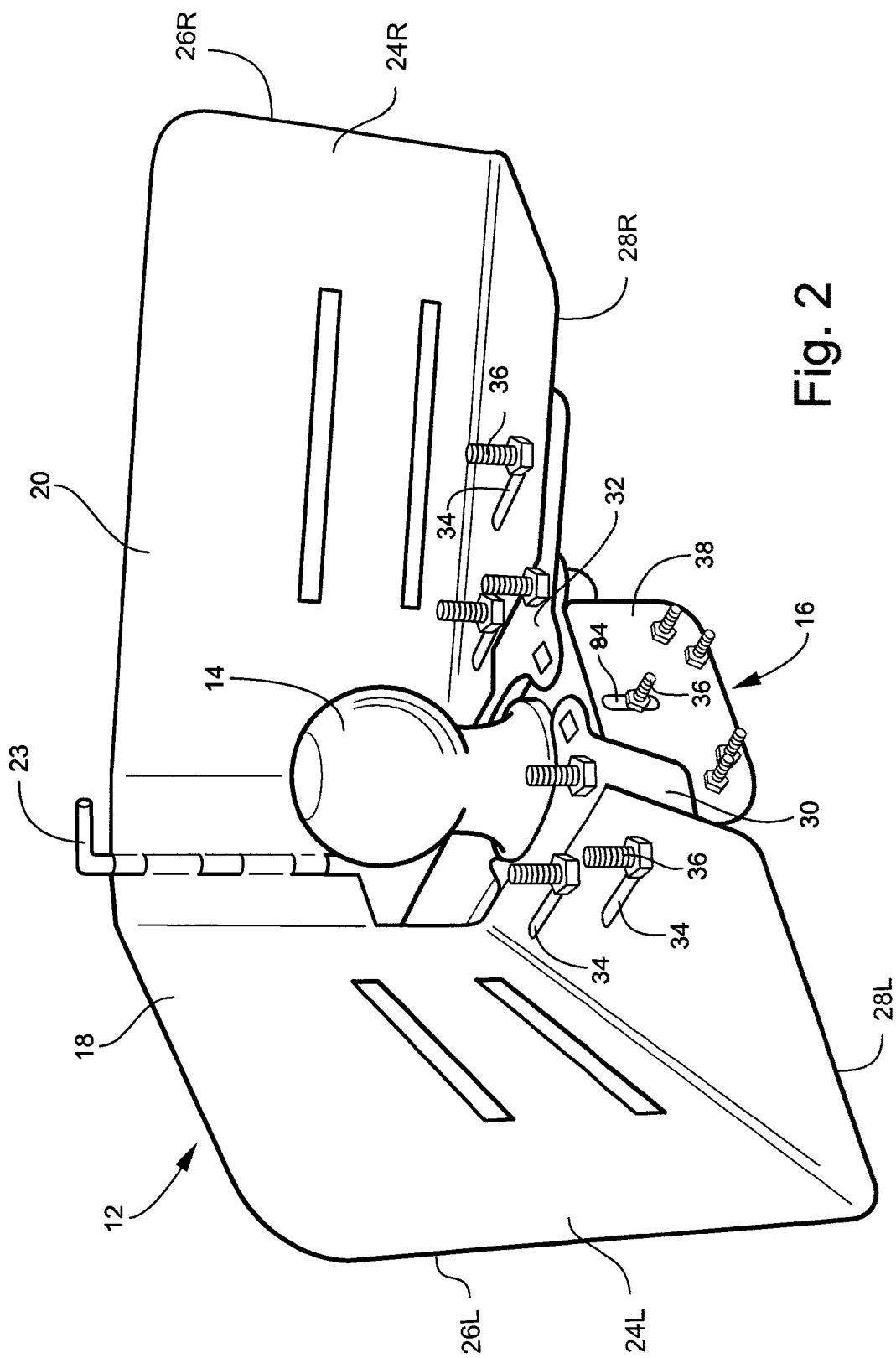
FIG. 2 is a perspective view a trailer hitch guide shown attached around a tow-ball and including a guide adjustably connected to a base.

Referring to FIG. 2, the guide apparatus 10 generally includes a guide 12 that functions to physically direct a misaligned tongue of a trailer toward and into correct alignment with an existing tow-ball 14, a base 16 that functions to attach the guide 12 to the hitch around the tow-ball 14, and first and second neck surrounds 30, 32 for trapping the tow-ball therebetween. At least the guide 12 of the guide apparatus 10 may be considered "universal" in that a single guide 12 may be used with bases of varying configuration to accommodate different hitch types. As stated above, the apparatus is configured for non-destructive and non-disruptive attachment to an existing hitch having any tow-ball configuration.

The guide 12 includes first and second halves 18, 20 releasably interconnected through a cooperatively formed hinge 22. The hinge 22 is assembled/disassembled by the insertion/removal, respectively, of a hinge pin 23. The hinge pin 23 may optionally be tethered to the guide 12 or any portion of the apparatus 10 in any manner to prevent the separation (i.e. loss) of the hinge pin 23 from the apparatus. The first and second halves 18, 20 cooperatively define a general "V"-shape, and in a specific embodiment form about a 90-degree angle therebetween, for physically directing a trailer tongue contacting the halves 18, 20 toward the tow-ball 14. The first and second halves 18, 20 each define a planar guiding surface 24 angled toward the tow-ball 14. As shown, the hinge 22 extends only a portion of the length of a side of the first and second guide halves 18, 20 to provide a clearance between the hinge 22 and underlying hitch, such as for the passage of wiring therethrough or to accommodate hitch structure. Each of the first and second halves 18, 20 generally include vertically extending portions 26L, 26R defining the planar guiding surfaces 24L, 24R, and horizontally extending portions 28L, 28R oriented generally perpendicular with respect to the vertically extending portions 26L, 26R and extending toward the trailer.

When installed, the guide 12 generally surrounds the existing tow-ball 14 from behind such that the tow-ball 14 is disposed forward of and generally centered with respect to the hinge 22. The guide 12 is adjustable in at least the fore and aft directions with respect to the tow-ball. The ability to dismantle the hinge 22 by withdrawing the hinge pin 23 allows the device to "open" (i.e. move the first and second halves 18, 20 apart) after trailer connection to facilitate removal of the apparatus 10. As described in further detail below, the first and second neck surrounds 30, 32 are connected to the first and second halves 18, 20, and thus are also pulled apart from the neck of the tow-ball with the opening of the first and second halves 18, 20. In the preferred embodiment, the first and second neck surrounds 30, 32 are pivotally connected to the base 16, and the first and second halves 18, 20 are directly connected to the first and second neck surrounds 30, 32.

Still referring to FIG. 2, the orientation of the horizontally extending portions 28L, 28R provides a planar, horizontal surface for seating flush upon the first and second neck surrounds 30, 32. The neck surrounds 30, 32 are shaped to substantially and cooperatively surround the neck portion of the tow-ball 14, thus "capturing" the tow-ball therebetween. Each of the first and second halves 18, 20 of the guide 12 and the neck surrounds 30, 32 define corresponding elongate slots 34 or openings therethrough to provide for adjustable interconnection through common fasteners 36, such as in the fore and aft directions with respect to each other and the tow-ball 14. The length and orientation of the slots 34 at least allows for travel of the guide 12 with respect to the base 16 to move the hinge 22 toward or apart from the tow-ball as needed to accommodate various tow-ball configurations.

As shown, the fasteners 36 include bolts with nuts installed from below, however alternative fasteners are envisioned. To adjust the fore/aft position of the guide 12 with respect to the base 16, the plurality of fasteners are loosened, the component moved, then tightened to secure in place. The guide 12 and base 16 should be securely engaged to resist movement therebetween caused by impact forces from the trailer. For example, should the engagement be "loose", force from the trailer may cause the guide 12 to move toward the vehicle and thus the trailer will "overshoot" the tow-ball 14. The first and second halves 18, 20 may have any length and height dependent upon the margin of misalignment error intended to be captured by the guide 12. As shown, the first and second halves 18, 20 include rounded corners for safety.

Still referring to FIG. 2, the base 16 further includes a front plate 38 adjustably positioned seated against the forwardmost portion of the hitch and in a generally vertical orientation. The front plate 38 functions to prevent the base 16 from moving in the direction toward the vehicle in response to loading forces and functions as an attachment point for arms 46, 48. The front plate 38 includes holes for fasteners 36 to provide datum points for fasteners 36. While guide 12 includes slots 84 to allow fore and aft adjustment of guide 12, first and second arms 46, 48 include horizontal slots to provide lateral adjustment to accommodate various hitch draw bar widths. Additionally, the fasteners datum points on front plate 38 provide a pivot point for opening the apparatus after trailer connection without compromising apparatus set-up. As stated above, device "opening" is facilitated by removing the hinge pin 23 from hinge 22 and moving first and second halves 18, 20 apart.

Figure 3:
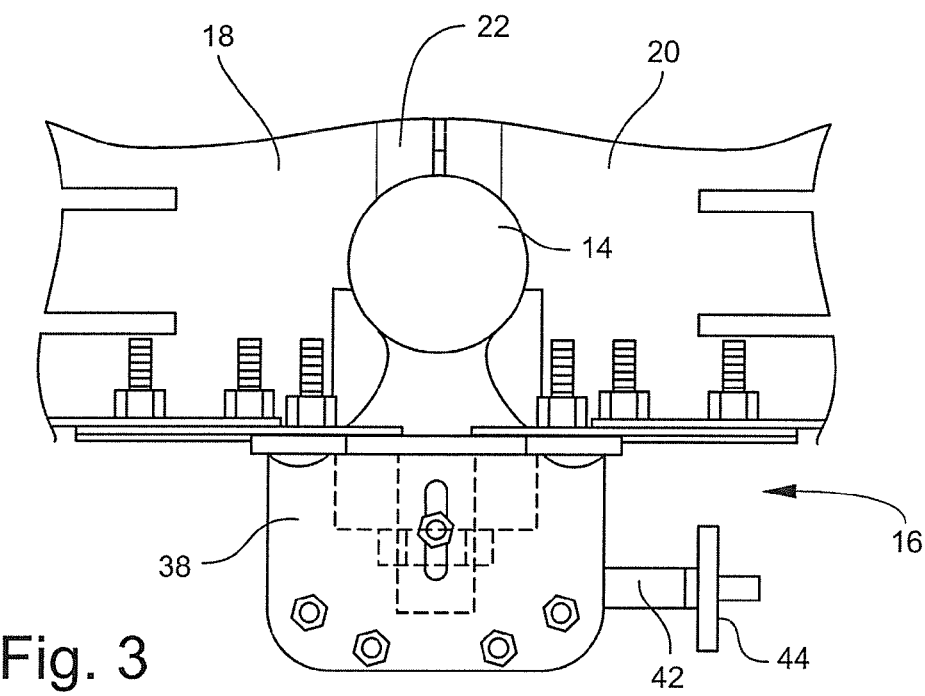
FIG. 3 is a front elevation view of a trailer hitch guide shown mounted to a single tow-ball hitch.
Figure 4:
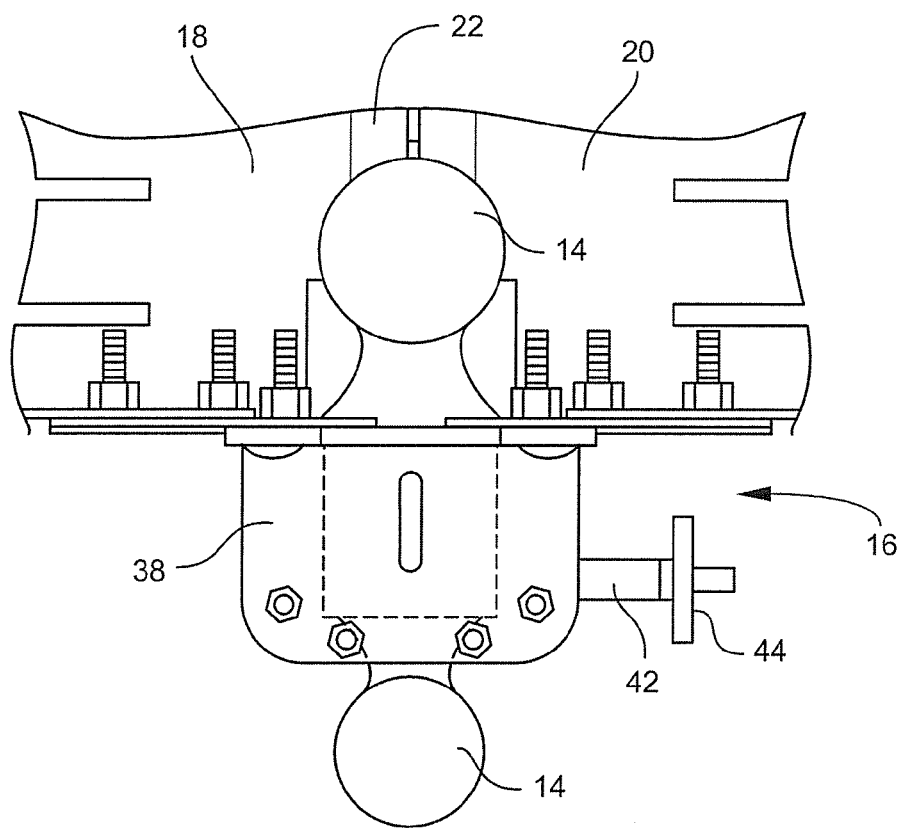
FIG. 4 is a front elevation view of a trailer hitch guide shown mounted to a double tow-ball hitch.
Figure 5:
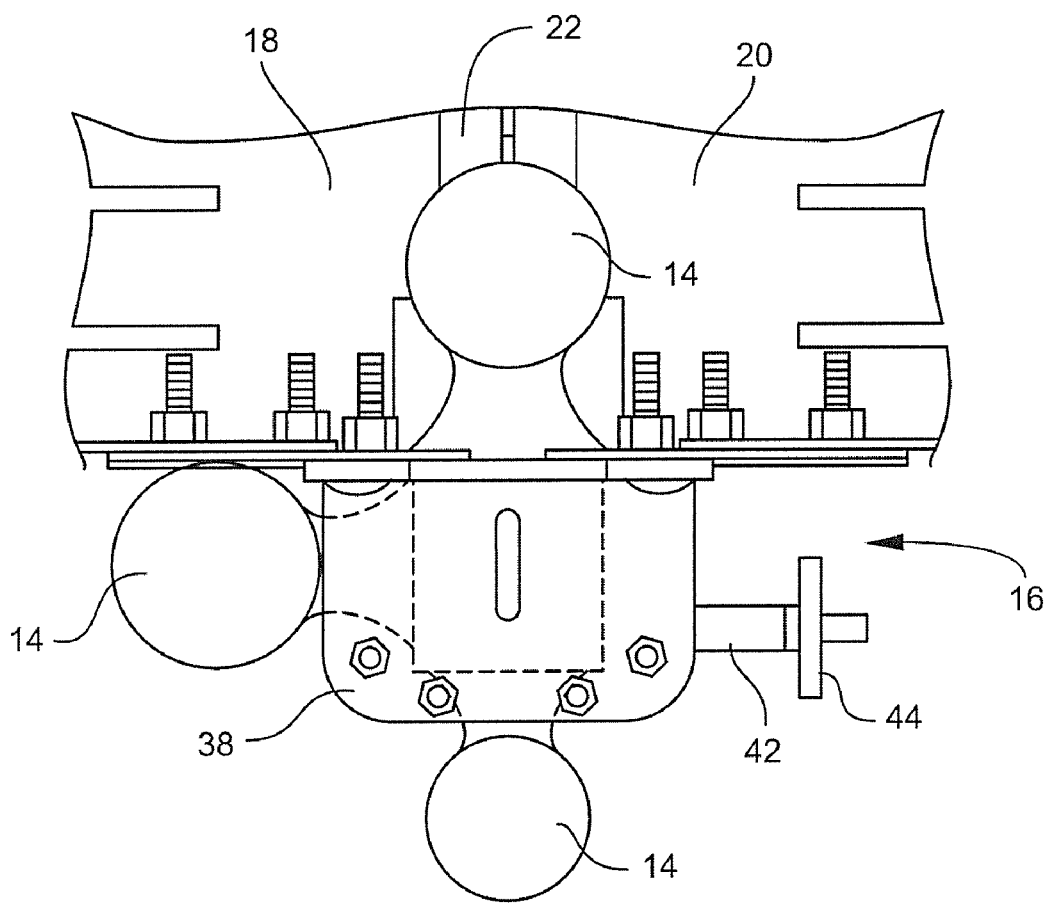
FIG. 5 is a front elevation view of a trailer hitch guide shown mounted to a triple tow-ball hitch.
Figure 6:
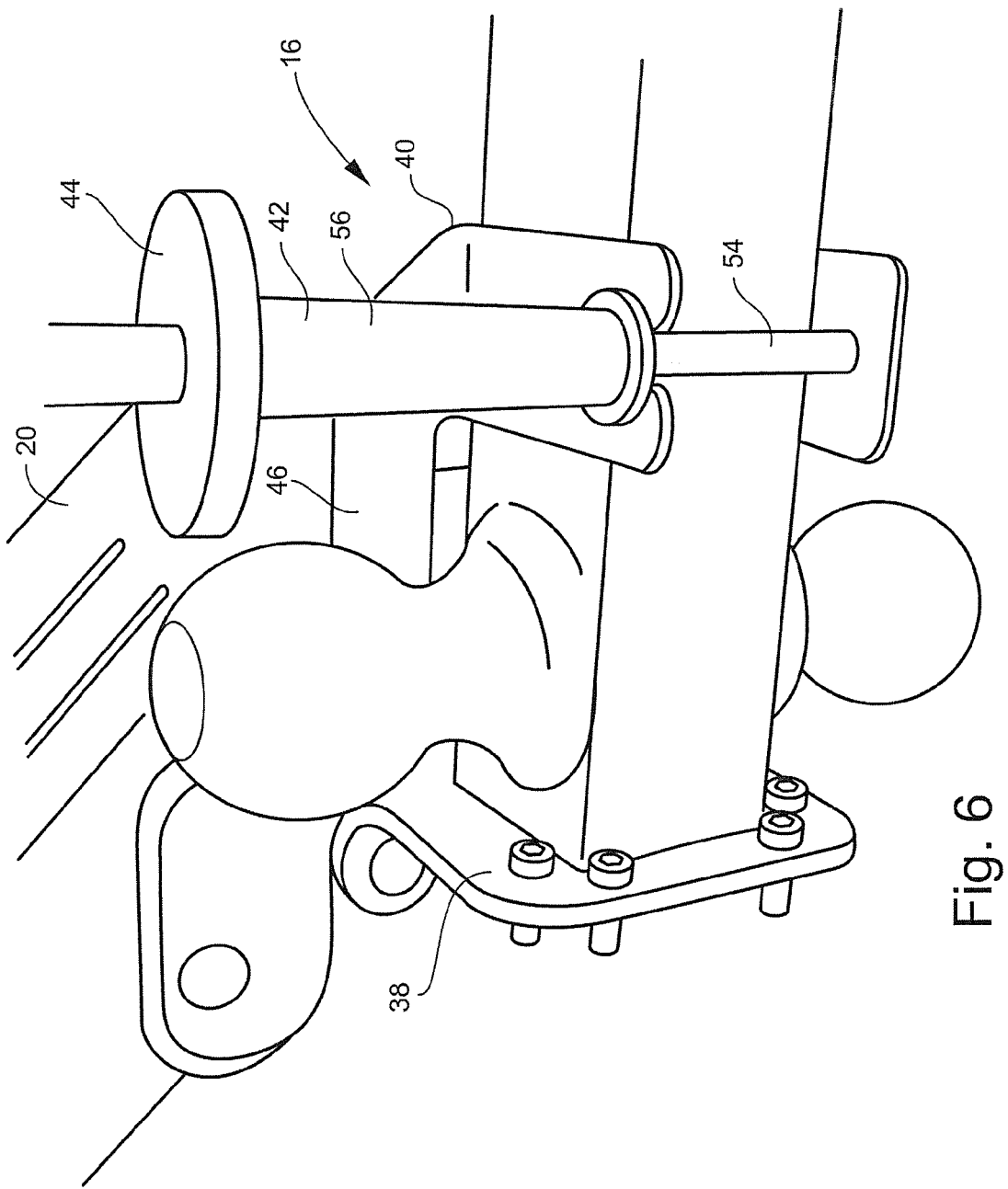
FIG. 6 is a detailed perspective view of a triple tow-ball hitch taken from the underside to illustrate mounting of the trailer hitch guide thereto.
Figure 7:
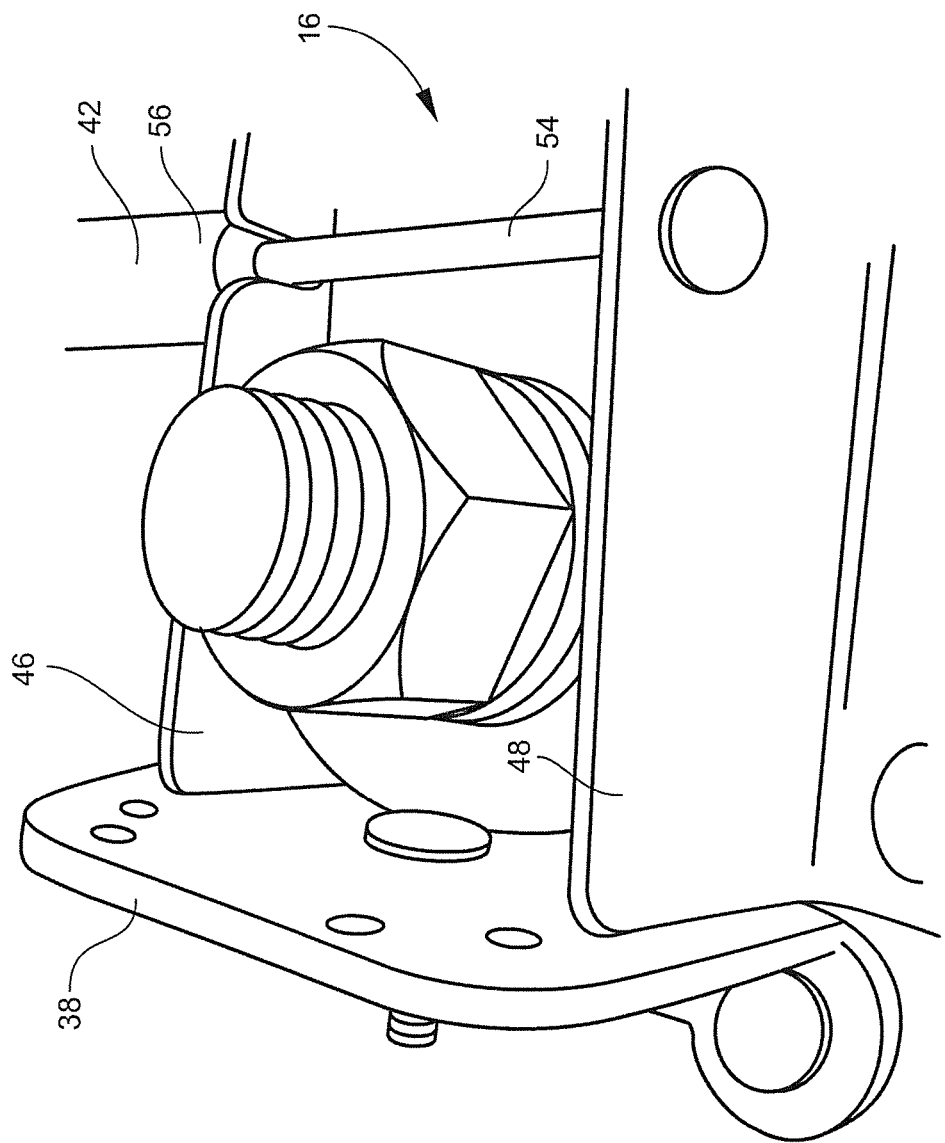
FIG. 7 is a detailed perspective view of a chassis-bolted tow-ball hitch taken from the underside to illustrate mounting of the trailer hitch guide thereto.

Referring to FIGS. 2-7, the mounting of the guide apparatus 10 to various hitches having single to triple tow-ball configurations is illustrated. Specifically, FIGS. 2, 3 and 7 illustrate a single tow-ball configuration, FIG. 4 illustrates a double tow-ball configuration, and FIGS. 5 and 6 illustrate alternative triple tow-ball configurations. As known in the art, a hitch may include various sized tow-balls peripherally disposed around the hitch to accommodate various trailer sizes. To select the correct size, a portion of the hitch is removed from a receiver, rotated, and reinserted to present the desired tow-ball size at the twelve o'clock position.

As stated above, the base 16 mounts to the hitch without requiring modification of the hitch or removal of the tow-ball 14. The base 16 generally includes the front plate 38, first and second arms 46, 48, and clamp 42 having a handle 44. In one embodiment, the front plate 38 and arms 46, 48 are integral and carry the clamp 42. In the preferred embodiment, the front plate 38 and arms 46, 48 are separate components connected together through fasteners to allow adjustability therebetween. The first and second arms 46, 48 extend longitudinally along the length of the hitch draw bar along the sides or top thereof. As shown, the first and second arms 46, 48 each define a general "L"-shape allowing the arms 46 to extend along the draw bar length, as well as extend laterally with respect thereto to position the clamp beneath the draw bar. Thus, the arms 46, 48 extend along the top surface of the draw bar and then along the sides thereof.

The base 16 is positioned over the hitch drawn bar around the tow-ball(s), with the hitch draw bar received between the first and second arms 46, 48. The front plate 38 is advanced until contact with the end of the draw bar. With the base 16 in place, that clamp 42 is installed and tightened to urge the arms 46, 48 toward each other. As shown, a bolt 54 of the clamp 42 is received through one the lateral members, such as member 52, and the body 56 of the clamp 42 including the handle 44 is threaded onto the bolt 54. The body 56 is advanced on the bolt 54 by rotation of the handle 44 to urge the arms 46, 48 and together.

Although specific embodiments of base construction are provided in this disclosure to accommodate exemplary tow-ball configurations and hitch draw bar shapes, it is intended that modifications may be made by one skilled in the art without departing from the function of the base 16. Specifically, alternative arm shapes including alternative means of adjustment with regard to the front plate and alternative clamping means are within one of ordinary skill in the art.

The first and second arms 46, 48 preferably define elongate slots for adjustable interconnection with the front plate 38 to accommodate draw bars of varying dimension. As illustrated in FIG. 2, a first set-up configuration includes first attaching the first and second neck surrounds 30, 32 to the base 16, followed by attaching the guide 12. In an alternative embodiment shown in FIG. 8, set-up includes first attaching the guide 12 to the base 16, followed by attaching the first and second neck surrounds 30, 32.

Figure 8:
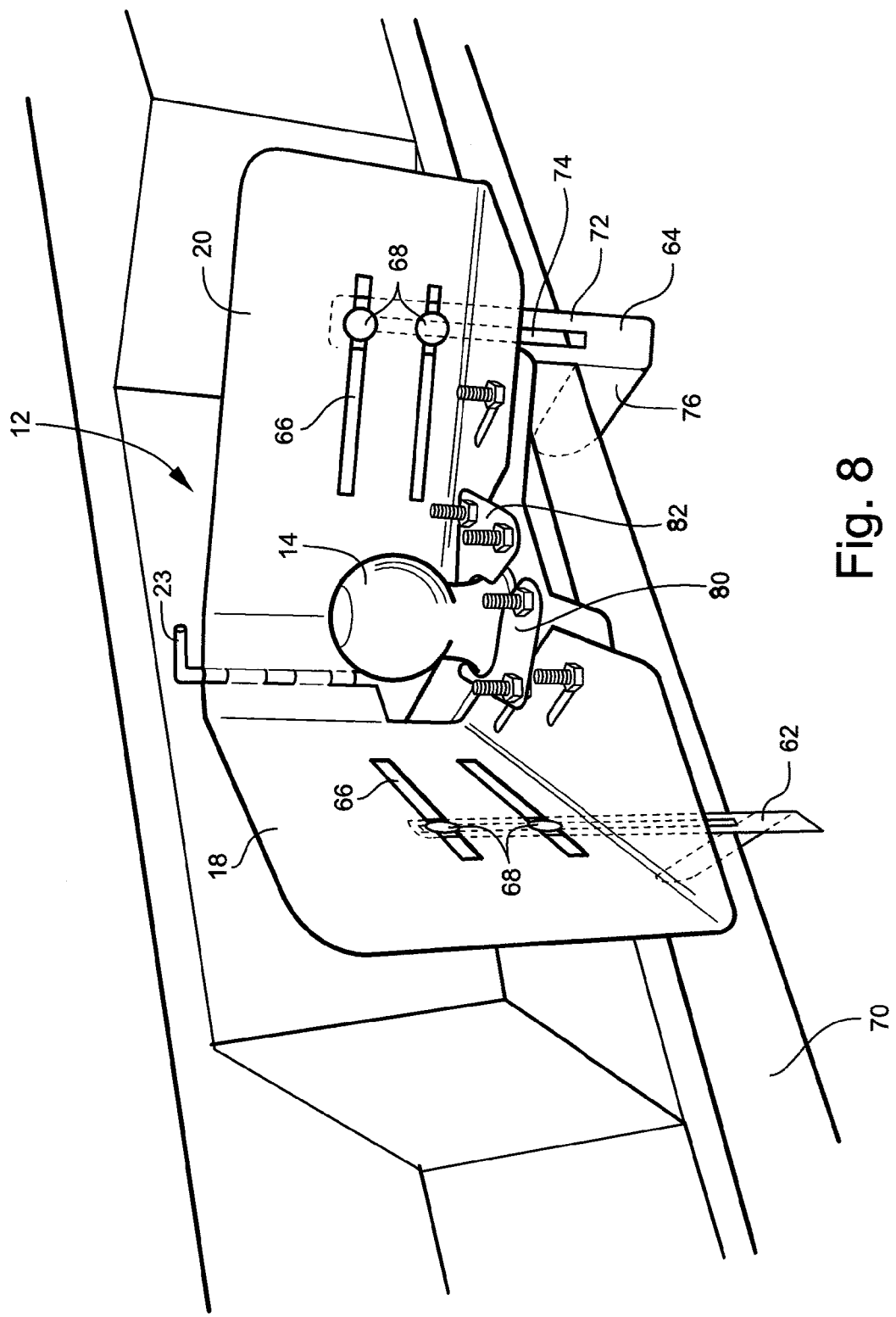
FIG. 8 is a perspective view of an alternative embodiment of a trailer hitch guide shown mounted upon a step bumper-type hitch.

Referring to FIG. 8, an alternative embodiment of a trailer hitch guide for use with a step bumper-type hitch is shown. As stated above, the guide 12 portion of the guide apparatus 10 is universal. As known to those skilled in the art, a tow-ball of a step bumper-type hitch is typically mounted to the bumper by way of an externally threaded post of the tow-ball received through a hole in the bumper and secured in place using a lock washer and internally threaded nut advanced on the post. Thus, a step bumper-type hitch typically lacks a draw bar.

As shown, the apparatus generally includes first and second neck surrounds 80, 82, guide 12, and first and second stabilizing brackets 62, 64. As in the previous embodiments, the first and second neck surrounds 80, 82 define geometry, albeit different referring to FIGS. 9 and 10, corresponding to the neck portion of the tow-ball 14 and are secured substantially surrounding the neck. The guide 12 is shown maintained between the first and second neck surrounds 80, 82 and the bumper, with the guide 12 being adjustable with respect to the fixed tow-ball.

Figure 10:
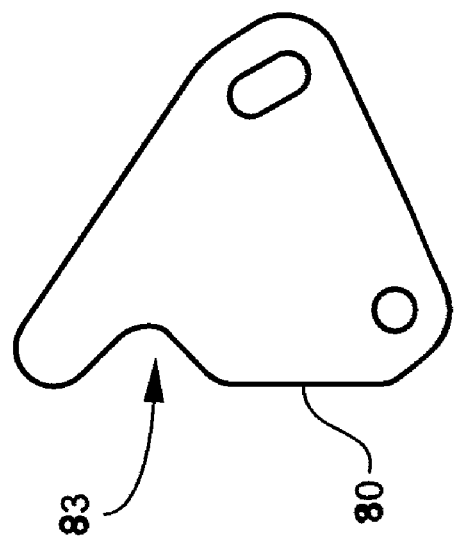
FIG. 10 is an isolated view of an exemplary neck surround for use with step bumper-type hitch configurations.
Figure 9:
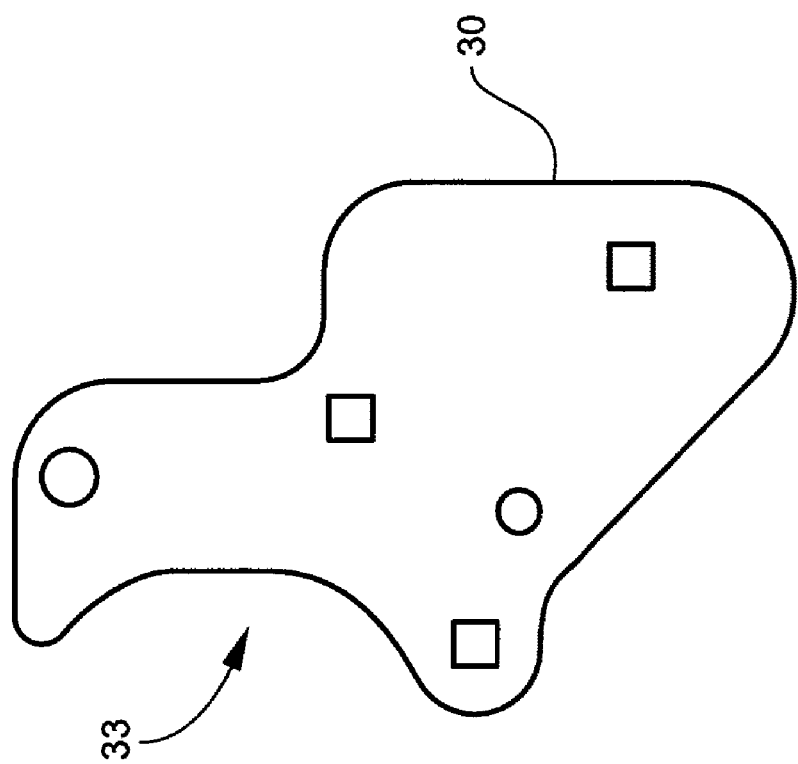
FIG. 9 is an isolated view of an exemplary neck surround for use with draw bar-type hitch configurations.

Referring to FIG. 9, one embodiment of a neck surround 30 for use with the hitch configurations of FIGS. 1-7 is shown, with the corresponding neck surround 32 being a mirror image thereof. The neck surround 30 defines geometry sufficient to provide support for the base 16 on top of the draw bar. Specifically, depending on draw bar width and tow-ball base diameter, there may be very little top surface exposed, thus requiring the surrounds 30, 32 to have the concave opening 33 to provide support for base 16 fore and aft of the tow-ball base. Referring to FIG. 10, one embodiment of a neck surround 80, for use with the hitch configuration of FIG. 8 is shown, with the corresponding neck surround 82 being a mirror image thereof. In the step bumper configuration, guide 12 has the support of the step bumper and thus the surrounds 80, 82 may have a smaller diameter concave opening 83 to capture the neck of the tow-ball to prevent lateral movement of the apparatus 10 during use.

Referring again to FIG. 8, the first and second halves 18, 20 of the guide 12 define at least one elongate slot 66 oriented perpendicular to the hinge 22 for slidingly receiving at least one guide member 68 or fastener of the first and second stabilizing brackets 62, 64 therethrough. First and second stabilizing brackets 62, 64 engage and align with the first and second halves 18, 20, respectively, of the guide 12 to stabilize and prevent rotation of the guide 12 with respect to the bumper 70. Specifically, the brackets 62, 64 include vertical portions 72 that seat flush against their respective half and define an elongate slot 74 along their length. The brackets 62, 64 further terminate at one end in a horizontal portion 76 that extends laterally from the vertical portion 72 and beneath the bumper when installed. Thus, the brackets 62, 64 generally define an "L"-shape. In use, the horizontal portion 76 is seated up against the bottom of the bumper and tightened in place at post or fastener 68. Thus, potentially only a one-time adjustment of the brackets 62, 64 is needed for a specific bumper, and removal of the guide apparatus 60 requires only the removal of the hinge pin 23 and pulling apart of the first and second halves 18, to "release" the neck of the tow-ball 14.

Although the components of the guide apparatus may be constructed from any suitable material, preferable materials include high strength coated or galvanized steels chosen for their advantageous properties of strength, rigidity and resistance to corrosion. It is envisioned that the guide apparatus embodiments described herein are suitable for use with integral bumper hitches, rotatable tubular hitches, and tongue-type hitches, among others. It is envisioned that the guide apparatus may be utilized with any existing hitch in which adequate room is provided about the ball of the hitch for attachment through a base. For example, bases may be configured to securely attach to tubular, square tube, flat tongue, bumper and other hitch constructions. It is further envisioned that certain components of the guide apparatus may be unitary or constructed from sub-components without affecting the functionality of the components. It is also envisioned that the guide apparatus may be provided in a kit or as a component of a larger hitch system.

While various embodiments of a trailer hitch guide apparatus have been described herein with reference to specific examples, it is envisioned that various details of the invention may be changed without departing from the scope of the invention. Furthermore, the foregoing description of the preferred embodiments of the invention and best mode for practicing the invention are provided for the purpose of illustration only and not for the purpose of limitation.

What is claimed is:

1. A trailer hitch guide apparatus for mounting around a tow-ball of a vehicle hitch, comprising:
   a guide comprising first and second halves cooperatively forming a hinge interconnecting the first and second halves, each of the first and second halves defining a substantially planar guiding surface and a flange oriented substantially perpendicular to the guiding surface, wherein at least one of the planar guiding surface and the flange define at least one elongate slot therethrough;
   a hinge pin for maintaining the hinge;
   first and second neck surrounds cooperatively defining geometry for surrounding a neck of the tow-ball;
   a base including first and second arms; and
   a clamp cooperatively carried on the first and second arms for urging the first and second arms toward each other;
   wherein the first and second neck surrounds are pivotally connected to the base and the first and second halves are connected to the first and second neck surrounds.

2. The trailer hitch guide apparatus according to claim 1, wherein each of the first and second arms defines a general "L"-shape, and wherein a first end of each of the first and second arms is interconnected with a plate and a second end carries the clamp.

3. The trailer hitch guide apparatus according to claim 1, wherein the first and second halves are not directly connected to the base.

4. The trailer hitch guide apparatus according to claim 1, wherein the first and second halves are connected to the first and second neck surrounds, respectively.

5. The trailer hitch guide apparatus according to claim 1, wherein the first and second halves each define at least one elongate slot through their guiding surfaces oriented generally perpendicular to the hinge, and wherein the trailer hitch guide apparatus further comprises first and second stabilizing brackets defining an elongate slot aligned perpendicularly with respect to the at least one elongate slot through the guiding surfaces.

6. The trailer hitch guide apparatus according to claim 5, wherein the each of the first and second stabilizing brackets is generally "L"-shaped.

7. The trailer hitch guide apparatus according to claim 1, wherein the hinge does not extend the full length of a side of each of the first and second halves.

8. The trailer hitch guide apparatus according to claim 1, wherein the first and second halves cooperatively define a "V"-shape.

9. The trailer hitch guide apparatus according to claim 1, wherein the guide, the first and second neck surrounds, and the base are interconnected.

10. A trailer hitch guide apparatus for mounting around a tow-ball of a vehicle hitch, comprising:
    a guide comprising first and second halves connected through a cooperatively formed hinge having a removable hinge pin, each of the first and second halves defining a guiding surface and a flange oriented substantially perpendicular to the guiding surface;
    first and second neck surrounds cooperatively defining geometry for surrounding a neck of the tow-ball;
    a base including first and second arms; and
    a clamp cooperatively carried on the first and second arms for urging the first and second arms toward each other;
    wherein the first and second neck surrounds are pivotally connected to the base and the first and second halves are connected to the first and second neck surrounds.

11. The trailer hitch guide apparatus according to claim 10, wherein each of the first and second arms defines a general "L"-shape, and wherein a first end of each of the first and second arms is interconnected with a plate and a second end carries the clamp.

12. The trailer hitch guide apparatus according to claim 10, wherein the first and second halves are not directly connected to the base.

13. The trailer hitch guide apparatus according to claim 10, wherein the first and second halves are connected to the first and second neck surrounds, respectively.

14. The trailer hitch guide apparatus according to claim 10, wherein the first and second halves each define at least one elongate slot through their guiding surfaces oriented generally perpendicular to the hinge, and wherein the trailer hitch guide apparatus further comprises first and second stabilizing brackets defining an elongate slot aligned perpendicularly with respect to the at least one elongate slot through the guiding surfaces.

15. The trailer hitch guide apparatus according to claim 14, wherein the each of the first and second stabilizing brackets is generally "L"-shaped.

16. The trailer hitch guide apparatus according to claim 10, wherein the hinge does not extend the full length of a side of each of the first and second halves.

17. The trailer hitch guide apparatus according to claim 10, wherein the first and second halves cooperatively define a "V"-shape.

18. The trailer hitch guide apparatus according to claim 10, wherein the guide, the first and second neck surrounds, and the base are interconnected.

* * * * *